UNITED STATES PATENT OFFICE.

WILHELM BAUER, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

PROCESS OF MAKING RED VAT-DYES.

No. 899,152.      Specification of Letters Patent.      Patented Sept. 22, 1908.

Application filed May 25, 1908. Serial No. 434,863.

*To all whom it may concern:*

Be it known that I, WILHELM BAUER, doctor of philosophy, chemist, citizen of the German Empire, residing at Vohwinkel, near Elberfeld, Kingdom of Prussia, Germany, have invented new and useful Improvements in Processes for Producing Red Vat Coloring-Matters, of which the following is a specification.

It is known that para-disubstituted phenylthioglycollic acids can be converted into red dyestuffs of the thioindigo red class by treatment at a moderate temperature with monohydrated sulfuric acid and they differ thereby from the previously examined derivatives of phenylthioglycollic acid. Sulfonation does not occur in this process. I have now found that this reaction proceeds considerably easier and smoother on using chlor-sulfonic acid

$(SO_2{<}^{Cl}_{OH})$ instead of monohydrated sulfuric acid. The conversion of the dihalogen arylthioglycollic acid into the red dyestuffs takes place with the greatest ease even at ordinary temperature and is complete after a short time without the formation of noticeable quantities of by-products and sulfonic acids.

The chlorsulfonic acid acts in a specific manner on the substituted arylthioglycollic acids. This is clearly proved by the fact that it can not only be used successfully for the production of red dyestuffs from the para-dihalogenated arylthioglycollic acids but also for the production of red dyestuffs from monohalogen and other dihalogen arylthioglycollic acids e. g. metachloro- or para-chloro- or 3.4-dichloro-phenylthioglycollic acid etc. I have further found that the success of the reaction is largely depending on the quantity of the chlorsulfonic acid used. With technical chlorsulfonic acid excellent yields are obtained while the use of a freshly distilled chlorsulfonic acid results in bad yields. On examining into the reasons for this remarkable difference it was discovered that a good result is only obtained if a chlorsulfonic acid is used which had attracted some moisture. The same effect can be obtained by adding 5 to 10 per cent. of monohydrated sulfuric acid to a freshly distilled chlorsulfonic acid which had not previously attracted moisture, and by then heating the mixture for a short time. This curious behavior of the so called pure chlorsulfonic acid is explained by the presence of a small quantity of sulfuryl chlorid contained therein which is removed by either exposure to the moisture of the air or by the heating with sulfuric acid.

In carrying out my process practically I can proceed as follows, the parts being by weight: One part of para-chlorophenylthioglycollic acid is introduced into 5 parts of chlorsulfonic acid (free from sulfuryl chlorid) which has to be cooled and stirred. The mixture assumes a brown color which gradually changes into an intense green while a strong evolution of hydrochloric acid takes place. The product of the reaction is tested from time to time by diluting a sample with ice water and a reaction is finished when on repeated testing it is found that the quantity of the dye has not been further increased. The melt is then poured on ice and the dyestuff which precipitates in red flakes is filtered off, washed and dried. It forms a crimson-red powder of a bronzy luster, soluble in concentrated sulfuric acid (66° Bé.) with a yellowish-green color. By means of reducing agents capable of forming vats e. g. hydrosulfite and NaOH it can be reduced to its leuco-compound. From the yellow vat thus prepared cotton and wool are dyed in yellow shades changing on exposure to air into a crimson-red. The dyeing can also be carried out by means of sodium sulfid. Other halogenated arylthioglycollic acids may be used.

Having now described my invention and in what manner the same is to be performed, what I claim as new and desire to secure by Letters Patent is:—

The process for producing red dyestuffs, which process consists in first treating halogenated arylthioglycollic acids with chlorsulfonic acid which is practically free from sulfuryl chlorid and isolating the red dyestuffs, substantially as described.

In testimony whereof I have hereunto set my hand in the presence of two subscribing witnesses.

WILHELM BAUER.

Witnesses:
    OTTO KÖNIG,
    WM. WASHINGTON BRUNSWICK.